United States Patent
Hershman

(10) Patent No.: US 10,878,133 B2
(45) Date of Patent: Dec. 29, 2020

(54) MITIGATION OF SIDE-CHANNEL ATTACKS USING SMALL-OVERHEAD RANDOM PRE-CHARGING

(71) Applicant: Nuvoton Technology Corporation, Hsin-chu (TW)

(72) Inventor: Ziv Hershman, Givat Shmuel (IL)

(73) Assignee: NUVOTON TECHNOLOGY CORPORATION, Hsin-Chu (TW)

( * ) Notice: Subject to any disclaimer, the term of this patent is extended or adjusted under 35 U.S.C. 154(b) by 234 days.

(21) Appl. No.: 16/194,342

(22) Filed: Nov. 18, 2018

(65) Prior Publication Data

US 2020/0159967 A1    May 21, 2020

(51) Int. Cl.
| | |
|---|---|
| *G06F 21/76* | (2013.01) |
| *G01R 31/3177* | (2006.01) |
| *H04L 9/08* | (2006.01) |
| *G06F 21/56* | (2013.01) |
| *G06F 21/72* | (2013.01) |
| *G01R 31/317* | (2006.01) |

(52) U.S. Cl.
CPC .......... *G06F 21/76* (2013.01); *G01R 31/3177* (2013.01); *G01R 31/31725* (2013.01); *G06F 21/567* (2013.01); *G06F 21/72* (2013.01); *H04L 9/0869* (2013.01)

(58) Field of Classification Search
CPC ....... G06F 21/00; G06F 21/76; H04L 9/0869; H04L 2209/08
USPC ......................................................... 713/189
See application file for complete search history.

(56) References Cited

U.S. PATENT DOCUMENTS

| | | | |
|---|---|---|---|
| 7,734,894 B1 * | 6/2010 | Wentzlaff ................ | G06F 15/16 712/10 |
| 7,893,742 B2 * | 2/2011 | Shibayama ........... | H03L 7/0816 327/161 |
| 8,804,949 B2 | 8/2014 | Fontana et al. | |
| 8,983,068 B2 * | 3/2015 | Gammel ................ | H04L 9/002 380/46 |

(Continued)

OTHER PUBLICATIONS

Verbauwhede ., "Integrated Circuits and Systems", Springer Science+Business Media, LLC, pp. 1-250, year 2010.

(Continued)

*Primary Examiner* — Teshome Hailu
(74) *Attorney, Agent, or Firm* — Kligler & Associates Patent Attorneys Ltd

(57) ABSTRACT

An electronic device includes a combinational logic circuit, one or more state-sampling components, and protection circuitry. The combinational logic circuit has one or more inputs and one or more outputs. The state-sampling components are configured to sample the outputs of the combinational logic circuit at successive clock cycles. The protection circuitry is configured to protect the combinational logic circuit by, per clock cycle, starting to apply random data to the inputs of the combinational logic circuit a given time duration before a sampling time of the state-sampling components for that clock cycle, and, after applying the random data, switching to apply functional data to the inputs of the combinational logic circuit, to be sampled by the state-sampling components. A propagation delay, over any signal path via the combinational logic circuit, is no less than the given time duration.

20 Claims, 5 Drawing Sheets

(56) References Cited

U.S. PATENT DOCUMENTS

| | | | |
|---|---|---|---|
| 2001/0017558 A1* | 8/2001 | Hanzawa | H03L 7/0814 |
| | | | 327/165 |
| 2008/0224727 A1 | 9/2008 | Verbauwhede et al. | |
| 2009/0222672 A1* | 9/2009 | Clarke | G06F 21/73 |
| | | | 713/189 |
| 2017/0163416 A1* | 6/2017 | Hars | H04L 9/0625 |
| 2018/0097618 A1 | 4/2018 | Kumar et al. | |

OTHER PUBLICATIONS

Bellizia et al., "Secure Double Rate Registers as an RTL Countermeasure Against Power Analysis Attacks", IEEE Transactions on Very Large Scale Integration (VLSI) Systems, pp. 1-9, year 2018.

Mangard et al., "Power Analysis Attacks: Revealing the Secrets of Smart Cards", Springer Science+Business Media, LLC, p. 233, year 2010.

Baddam, K., "Hardware Level Countermeasures Against Differential Power Analysis", Doctor Thesis, University of Southampton, Faculty of Physical and Applied Sciences, School of Electronics and Computer Science, pp. 1-388, Feb. 2012.

U.S. Appl. No. 16/741,779 Office Action dated Jul. 6, 2020.

* cited by examiner

MITIGATION OF SIDE-CHANNEL ATTACKS USING SMALL-OVERHEAD RANDOM PRE-CHARGING

FIELD OF THE INVENTION

The present invention relates generally to data security in electronic circuitry, and particularly to methods and systems for protection against side-channel attacks.

BACKGROUND OF THE INVENTION

Various techniques, such as side-channel attacks, have been developed for extracting information from electronic devices. The attacks are typically performed by unauthorized parties in order to access secret information stored within the devices. Some side-channel attacks take advantage of the fact that electronic devices typically consume power during transitions of logic elements. The attacks extract information by non-invasively measuring electrical signals and/or radiation emitted from the devices, without electrically contacting the devices that carry the information.

Various countermeasures have been proposed for protecting electronic devices against side-channel attacks. For example, Baddam describes several types of countermeasures, and in particular Dual Rail Precharge (DRP) circuits, in a PhD Thesis entitled "Hardware Level Countermeasures Against Differential Power Analysis," University of Southampton, Faculty of Physical and Applied Sciences, School of Electronics and Computer Science, February, 2012.

SUMMARY OF THE INVENTION

An embodiment of the present invention that is described herein provides an electronic device including a combinational logic circuit, one or more state-sampling components, and protection circuitry. The combinational logic circuit has one or more inputs and one or more outputs. The one or more state-sampling components are configured to sample the outputs of the combinational logic circuit at successive clock cycles. The protection circuitry is configured to protect the combinational logic circuit by performing, per clock cycle: (i) starting to apply random data to the inputs of the combinational logic circuit a given time duration before a sampling time of the state-sampling components for that clock cycle, and (ii) after applying the random data, switching to apply functional data to the inputs of the combinational logic circuit, to be sampled by the state-sampling components. A propagation delay, over any signal path via the combinational logic circuit between the inputs and the outputs, is no less than the given time duration by which a beginning of the random data precedes the sampling time of the state-sampling components.

Typically, both the random data and the functional data are provided as input to the state-sampling components, but, due to the propagation delay being no less than the given time duration, the state-sampling components sample only the functional data and not the random data. In some embodiments, the combinational logic has a hold-time margin that is set to be at least the given time duration. In an embodiment, the combinational logic includes one or more delay elements inserted in one or more signal paths, for setting the hold-time margin to be at least the given time duration.

In a disclosed embodiment, the electronic device includes at least first and second cryptographic engines for performing cryptographic operations, and the protection circuitry is configured to generate the random data using the first cryptographic engine while the first cryptographic engine is not used for performing the cryptographic operations, and to generate the random data using the second cryptographic engine while the second cryptographic engine is not used for performing the cryptographic operations.

In an embodiment, the protection circuitry is configured to modify the random data multiple times per clock cycle. In a disclosed embodiment, a timing of applying the random data and the functional data is preconfigured in the electronic device based on an individual performance of the combinational logic. In another embodiment, the protection circuitry is configured to adaptively modify a timing of applying the random data and the functional data over time, based on actual performance of the combinational logic. The protection circuitry may be configured to adaptively modify the timing so as to maximize a duty-cycle of applying the random data. In an embodiment, the random data has completed propagation through all signal paths via the combinational logic circuit before subsequent functional data is applied to the inputs of the combinational logic circuit.

There is additionally provided, in accordance with an embodiment of the present invention, a method for protecting a combinational logic circuit having one or more inputs and one or more outputs. The method includes sampling the outputs of the combinational logic circuit at successive clock cycles using one or more state-sampling components. The combinational logic circuit is protected by performing, per clock cycle, (i) starting to apply random data to the inputs of the combinational logic circuit a given time duration before a sampling time of the state-sampling components for that clock cycle, and (ii) after applying the random data, switching to apply functional data to the inputs of the combinational logic circuit, to be sampled by the state-sampling components, wherein a propagation delay, over any signal path via the combinational logic circuit between the inputs and the outputs, is no less than the given time duration by which a beginning of the random data precedes the sampling time of the state-sampling components.

The present invention will be more fully understood from the following detailed description of the embodiments thereof, taken together with the drawings in which:

DETAILED DESCRIPTION OF EMBODIMENTS

Overview

Figure 1:
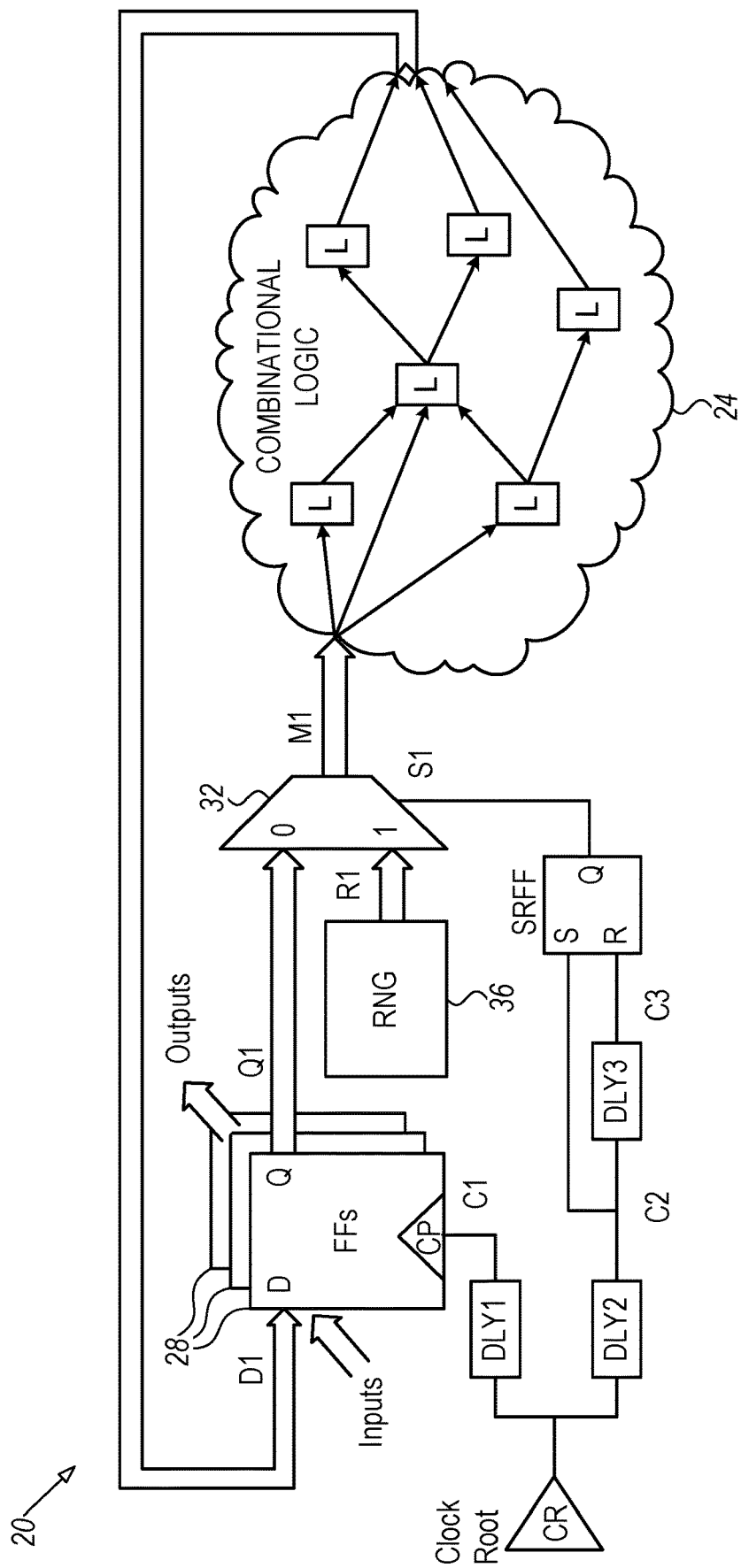
FIG. 1 is a block diagram that schematically illustrates a secure electronic device protected against side-channel attacks, in accordance with an embodiment of the present invention.

Embodiments of the present invention that are described herein provide improved methods and circuitry for protecting electronic devices against side-channel attacks. The disclosed techniques can be used in various types of secure devices, such as secure memory devices and embedded controllers.

In the disclosed embodiments, a secure electronic device comprises combinational logic. The combinational logic typically comprises multiple interconnected logic stages that together perform some designated secure operation on functional data. The combinational logic receives the functional data for processing on one or more inputs, and provides the processing results on one or more outputs. One or more Flip-Flops (FFs), or other state-sampling components, are configured to sample the outputs of the combinational logic at successive clock cycles. The sampled outputs serve as the inputs in the next clock cycle.

The secure device further comprises protection circuitry, which is configured to protect the combinational logic from side-channel attacks. In some embodiments, the protection circuitry applies random data to the inputs of the combinational logic, in alternation with the functional data, every clock cycle (in the present context, pseudorandom data is also considered a type of random data). As a result, the combinational logic processes random data for part of the clock cycle, and then functional data for the remainder of the clock cycle. Processing of the random data effectively randomizes the instantaneous power consumption of the combinational logic, making it difficult for an attacker to reconstruct secret information by sensing power consumption or radiated power.

It is noted that in the disclosed solution, the functional data and the random data travel the same signal paths and pass through the same FFs. In a given clock cycle, the protection circuitry typically starts to apply random data to the inputs of the combinational logic a certain time duration before the sampling time of the FFs for that clock cycle. At some later point, the protection circuitry switches to apply functional data to the inputs of the combinational logic, to be sampled by the FFs.

Applying the random data early has the advantage of increasing the percentage of time during which the combinational logic processes random data, and therefore better randomizes the power consumption. On the other hand, applying the random data early has the risk that, due to timing variations, the FFs might sample random data instead of functional data. Specifically, the FFs will sample random data if the propagation delay of at least one signal path via the combinational logic is shorter than the time duration by which the beginning of the random data precedes the FF sampling time.

In some embodiments, the design of the protection circuitry and/or of the combinational logic guarantees that the above scenario does not occur. In other words, the design guarantees that the propagation delay of any path via the combinational logic is no less than the time duration by which the beginning of the random data precedes the FF sampling time. With this constraint, the FFs never sample random data, only functional data, even though the random data is applied to the inputs of the combinational logic before the FF sampling time.

In some embodiments, the above constraint is met by setting a suitable lower bound on the hold-time margin of the combinational logic. Setting such a lower bound is equivalent to balancing the propagation delays of the various signal paths through the combinational logic. In an embodiment, balancing the propagation delays is performed by inserting delay elements into one or more of the signal paths, typically the paths having the smallest propagation delays.

The disclosed techniques provide security against side-channel attacks. In some embodiments the random data is generated using existing cryptographic engines of the secure device. Moreover, since the random data is applied during the hold-time and/or setup-time margin, the disclosed solution has little or no impact on clock speed. In most practical scenarios, random data and functional data overlap in time as they travel through different paths through the combinational logic. This time overlap further increases the level of randomization of power consumption, and thus the level of security. Furthermore, since the disclosed techniques reduce the percentage of the clock cycle in which functional data is applied to the combinational logic, static leakage from the secure device is also reduced.

Various implementations of the disclosed techniques, and associated performance trade-offs, are described herein.

System Description

FIG. 1 is a block diagram that schematically illustrates a secure electronic device 20 protected against side-channel attacks, in accordance with an embodiment of the present invention. Device 20 may comprise, for example, an Integrated Circuit (IC) such as a memory device with integrated encryption circuitry, or an Embedded Controller (EC) or Baseboard Management Controller (BMC) that comprises encryption or authentication circuitry, or any other suitable secure electronic device.

In the present example, device 20 comprises a combinational logic circuit 24. Circuit 24 has one or more inputs denoted M1, over which the circuit receives digital input signals that convey input data, and one or more outputs denoted D1, over which the circuit outputs digital output signals that convey output data. Circuit 24 comprises multiple interconnected logic stages, denoted L, e.g., logic gates. Logic stages L carry out the designated function of circuit 24, or in other words convert inputs M1 into outputs D1. Being purely combinational, circuit 24 is memoryless, i.e., outputs D1 depend only on the present values of inputs M1.

Device 20 further comprises one or more Flip-Flops (FFs) 28, which are configured to sample the outputs D1 of combinational logic circuit 24 at successive clock cycles. FFs 28 are also referred to herein as "state-sampling components" since in essence they sample the present state of combinational logic circuit 24. In other embodiments, the state-sampling components may alternatively comprise latches, Static Random Access Memory (SRAM) cells, or any other suitable type of memory cells. Each sampled output may be "logic high" or "logic low".

FFs 28 are clocked by a clock signal denoted C1, which originates from a clock root denoted CR. In the present example, although not necessarily, FFs 28 sample the outputs D1 on the rising edge of each cycle of clock signal C1. (C1 is thus also referred to as "sampling clock"). The resulting sampled outputs (not including outputs that are only used as outputs of module 20 and not by the internal module logic) are denoted Q1. Sampled outputs Q1 are applied to inputs M1 of combinational logic circuit 24 (via a multiplexer 32 that is discussed further below), and serve as the input signals of circuit 24 for the next clock cycle.

In some embodiments, combinational logic circuit 24 is configured to perform a certain secure operation or a building-block thereof. Circuit 24 may comprise, for example, a multiplication stage, a circuit that performs an iteration of an encryption, decryption, signing or authentication process, or any other suitable type of security-related operation.

Unless adequately protected, the instantaneous power consumption of circuit 24 may be sensed by an attacker, and used for illegitimately extracting secret information. An attacker might sense, for example, the instantaneous electrical power consumed by device 20 from a power supply, or the instantaneous power of the electromagnetic emission from device 20.

In some embodiments, secure device 20 further comprises protection circuitry, which is configured to protect device 20 against such side-channel attacks. In the present example, the protection circuitry comprises the following elements:

A Random Number Generator (RNG) 36, which is configured to generate a stream of random or pseudorandom data words denoted R1. The random data is also denoted Random Pre-charging Data (RPD).

Multiplexer (MUX) 32, which is configured to alternately drive inputs M1 with the random data R1 (RPD) and with sampled outputs Q1 (the functional output data of circuit 24, also referred to as Algorithm Data—ALD).

Delay elements denoted DLY1, DLY2 and DLY3 in the clock tree, and an SR Flip-Flop denoted SRFF. These elements control the relative timing between clock signal C1 (that clocks FFs 28) and a MUX control signal S1 (that controls MUX 32). Typically, DLY1 is a property of the clock tree, while DLY2 and DLY3 are design choices that will be discussed at length below. In the present example, although not necessarily, DLY2 is the difference between DLY1 and DLY3.

Figure 4:
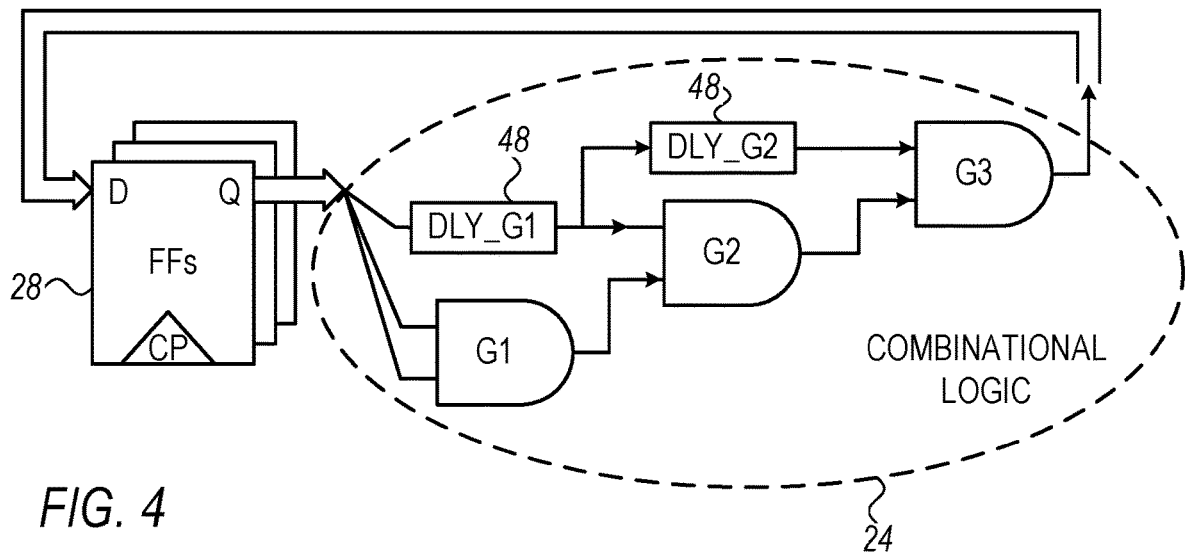
FIG. 4 is a block diagram that schematically illustrates combinational logic with balanced delays, in accordance with an embodiment of the present invention.

Optionally, delay elements within combinational logic circuit 24 (examples of which are shown in FIG. 4 further below).

Protection Against Side-Channel Attacks Using Random Pre-Charging

As noted above, the protection circuitry drives the inputs of combinational logic circuit 24 with functional data (ALD) and random data (RPD), in alternation. The alternation is typically performed within every clock cycle. In other words, each clock cycle comprises (i) a time interval in which RPD is input to the combinational logic, and (ii) a time interval in which ALD is input to the combinational logic. In response to these inputs, each logic stage L processes random data during part of the clock cycle, and functional data during the remaining part of the clock cycle. As a result, the instantaneous power consumption of logic 24 is randomized, making it difficult for an attacker to reconstruct the functional data (ALD) by sensing power consumption or radiated energy.

In some embodiments, the protection circuitry chooses the exact timing of when to drive the combinational logic with random data (RPD), and when to drive the combinational logic with functional data (ALD), with a timing that meets the following conditions:

Per clock cycle, random data is provided on the inputs of the combinational logic before the functional data has stabilized for sampling, i.e., before the sampling time of FFs for that clock cycle. In other words, signal S1 controls MUX 32 to place the output of RNG 36 on inputs M1 before the rising edge of clock signal C1.

Nevertheless, FFs 28 never sample random data (RPD), only functional data (ALD).

In order to meet these two conditions, the signal propagation time (also referred to herein as propagation delay) of any path via combinational logic 24 must be sufficiently high. If the propagation path delay (of at least one path) via combinational logic is too low, random data will reach outputs D1 before the sampling time of FFs 28, and will be sampled.

More specifically, as will be demonstrated in FIG. 2 below, the time duration by which the beginning of the random data (at inputs M1) precedes the sampling by FFs 28 (rising edge of clock signal C1) is equal to DLY3. In order to guarantee that FFs 28 will never sample random data, the minimum propagation time via combinational logic 24 (over any path from inputs M1 to outputs D1) must be no less than DLY3.

Figure 2:
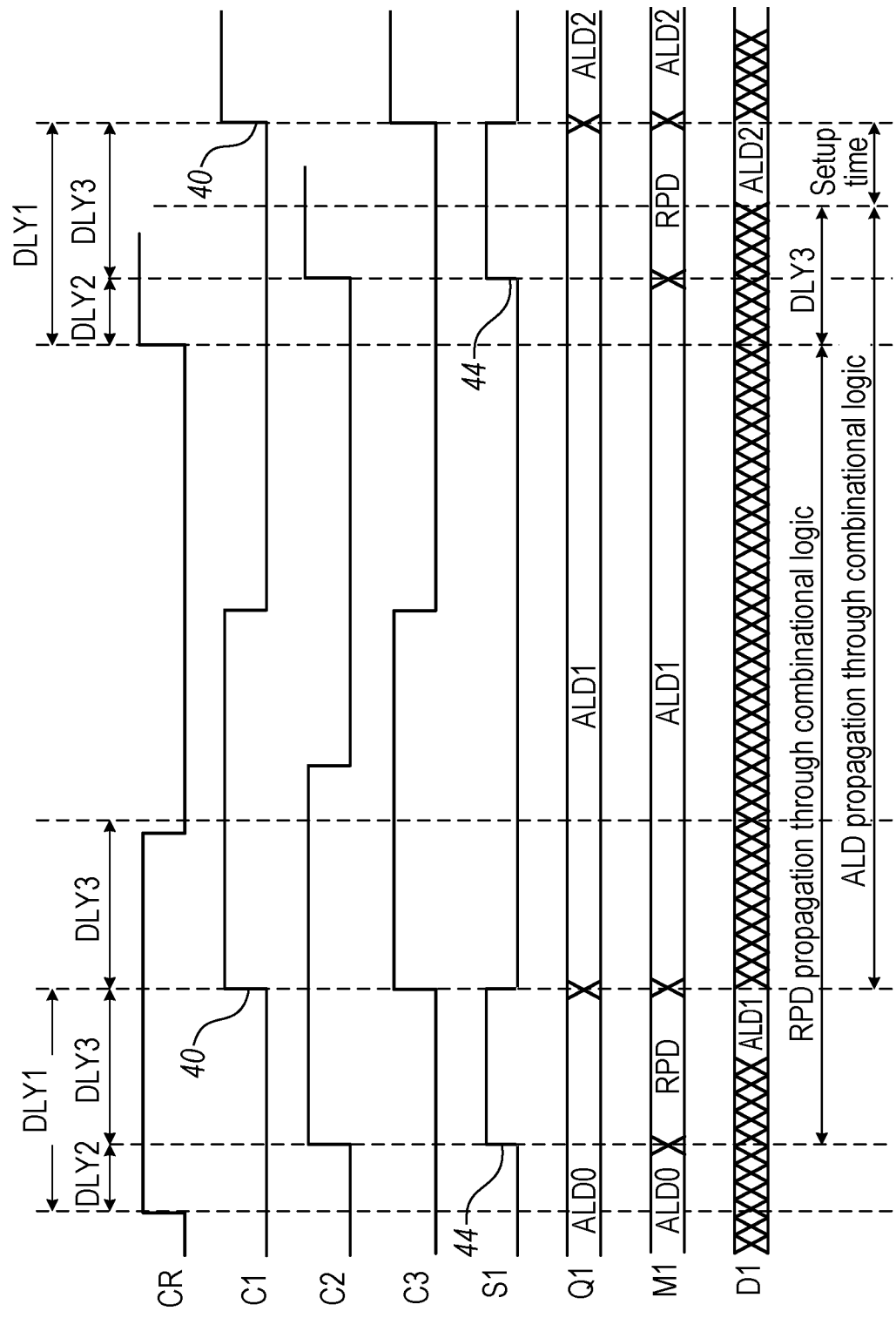
FIGS. 2 and 3 are diagrams showing signal timing in the electronic device of FIG. 1, in accordance with embodiments of the present invention.

FIG. 2 is a diagram showing signal timing in secure device 20 of FIG. 1, in accordance with an embodiment of the present invention. The diagram shows the following signals, from top to bottom, on a time axis:

C1—The clock signal provided to FFs 28. In the present example, FFs sample the outputs D1 of combinational logic 24 on the rising edges of C1. The sampling times of FFs 28 are denoted 40.

S1—The control signal that controls MUX 32. In the present example, when S1 is "logic high" MUX 32 selects the random data R1 produced by RNG 36. When S1 is "logic low" MUX 32 selects the sampled functional data Q1. The times at which MUX 32 starts to apply random data (signal S1 switches from "logic low" to "logic high") are denoted 44.

Q1—The functional data (ALD) as sampled by FFs 28 at sampling times 40. The functional data in successive clock cycles is denoted ALD1, ALD2, ALD3, . . . .

M1—The inputs to combinational logic circuit 24, provided by MUX 32. As described above, the signal at inputs M1 alternates between random data (RPD) and functional data (ALD) in accordance with signal S1. The random data in successive clock cycles is denoted RPD1, RPD2, RPD3, . . . .

D1—The outputs of combinational logic circuit 24. In the present example, different paths via the combinational logic circuit have different delays. As such, during some of the time (denoted XXXXX in the figure) the signals D1 carry a mix of transient data, random data and functional data. During other times, either all the signals in D1 carry only stable (non-transitional) random data (RPD), or all the signals in D1 carry only stable (non-transitional) functional data (ALD).

As can be seen in the figure (e.g., by examining inputs M1), combinational logic 24 processes random data during a significant portion of each clock cycle, and functional data for the rest of the clock cycle. As a result, the instantaneous power consumption and radiated energy are randomized, thereby protecting device 20 from side-channel attacks.

Notwithstanding the fact that logic 24 processes random data during a considerable portion of each clock cycle, FFs 28 sample only functional data, never random data. This property can be seen by examining signal Q1 (which is the sampled version of outputs D1, sampled at times 40).

Figure 3:
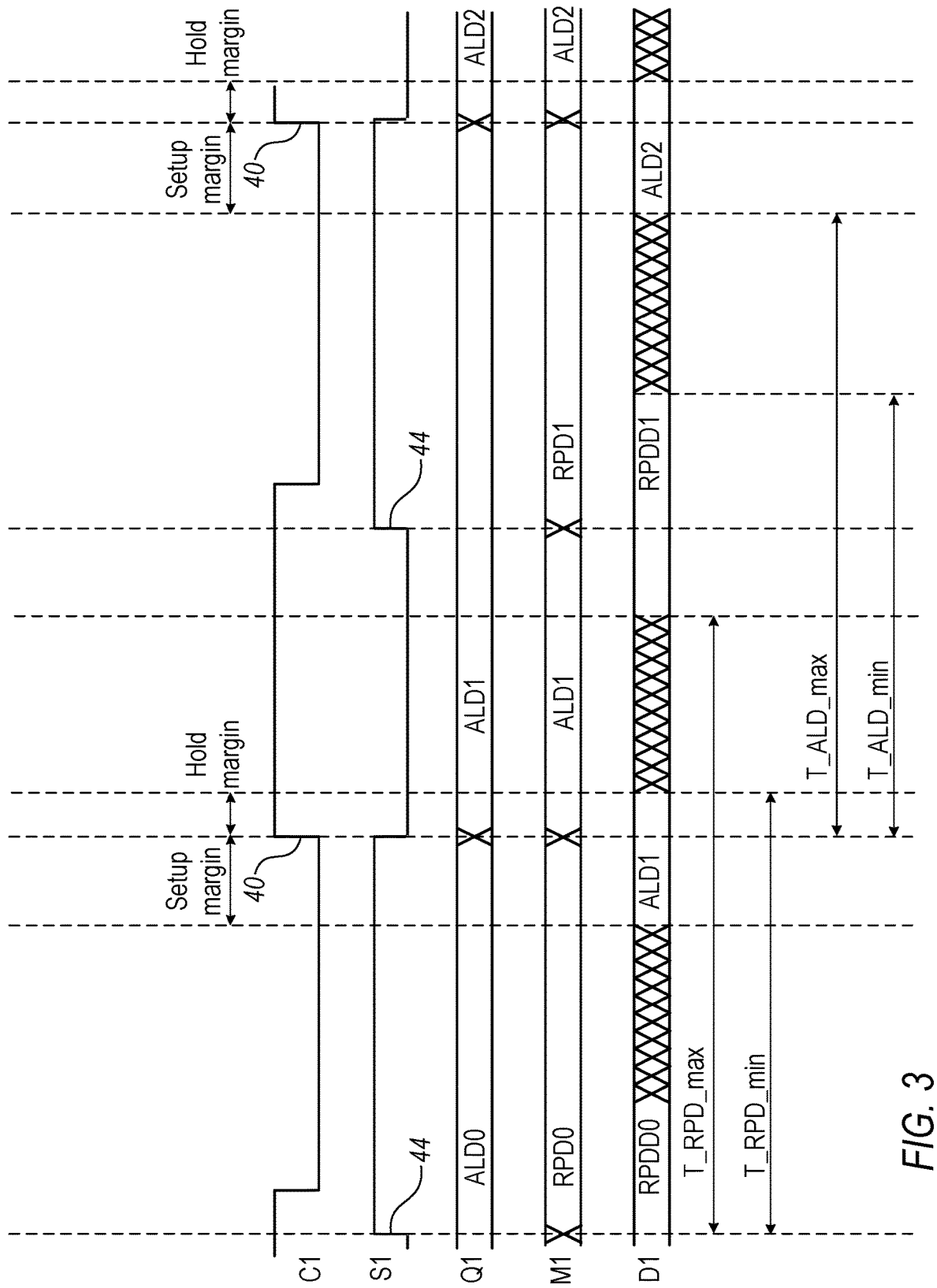

FIG. 3 is a diagram showing signal timing in secure device 20 of FIG. 1, in accordance with an alternative embodiment of the present invention. Relative to the example of FIG. 2, the example of FIG. 3 shows a more aggressive design choice that provides a high degree of protection against side-channel attacks, at the expense of more stringent requirements on delay balancing in combinational logic 24.

In FIG. 3, T_RPD_max denotes the maximal propagation time of the random data through combinational logic 24. T_RPD_min denotes the minimal propagation time of the random data through the combinational logic. T_ALD_max denotes the maximal propagation time of the functional data through combinational logic 24. T_ALD_min denotes the minimal propagation time of the functional data through the combinational logic. The setup-time margin and hold-time margin are also shown.

The random data at M1 is denoted RPD0, RPD1, . . . , whereas the random data at D1 is denoted RPDD0, RPDD1, . . . . RPD values may differ from corresponding RPDD values, since the combinatorial logic may change at least some of them.

Considering the embodiment described in FIG. 1 and FIG. 3, it can be seen that RPDD has a stable time around the falling edge of C1. Therefore, in another embodiment, RPDD can be sampled by a set of falling-edge FFs and used as the pseudo random data R1 of the next cycle. In yet another embodiment, RPDD can also be 'XOR'ed with the output of RNG 36, to enhance the randomness of R1. Note that combinational logic 24 processes two sets of data in a single clock cycle (in this particular case, once for ALD processing and another for RPD processing) without degrading the circuit critical setup path delay.

FIGS. 2 and 3 show just two examples of how the timing and pulse-width of S1 (i.e., the alternation between random data and functional data) can be set relative to sampling clock C1. Other timing and pulse-width settings can also be used. Constraints and design considerations for defining S1 are addressed further below.

For clarity and ease of explanation, the propagation delay of MUX 32 and FFs 28 is assumed negligible in the figures. In the SRFF that derives S1 from clocks C2 and C3, the Reset input (R) is assumed to have higher priority than the Set input (S). Also for clarity, in the present examples the falling edges of signal S1 coincide with the rising edges of C1. This relationship, however, is not mandatory and other relationships are possible. For example, the falling edge of S1 may be later than the rising edge of C1. In this case, however, the critical setup timing may be affected because the maximum propagation time for ALD starts only from the falling edge of S1, but still ends on the rising edge of C1. Further delaying the fall times of S1 will increase the durations of the random data, i.e., increase the level of protection, at the expense of more stringent setup time requirements in logic 24.

In some embodiments, the configuration of FIG. 1 is duplicated multiple times in device 20 and applied to multiple respective portions of combinational logic 24. In other words, combinational logic 24 may be split into several parts (e.g., based on timing and/or physical proximity). A separate instance of the protection circuitry may be coupled to each part (including a separate MUX and separate MUX control, possibly with different delay values of DLY1, DLY2 and/or DLY3).

Figure 6:
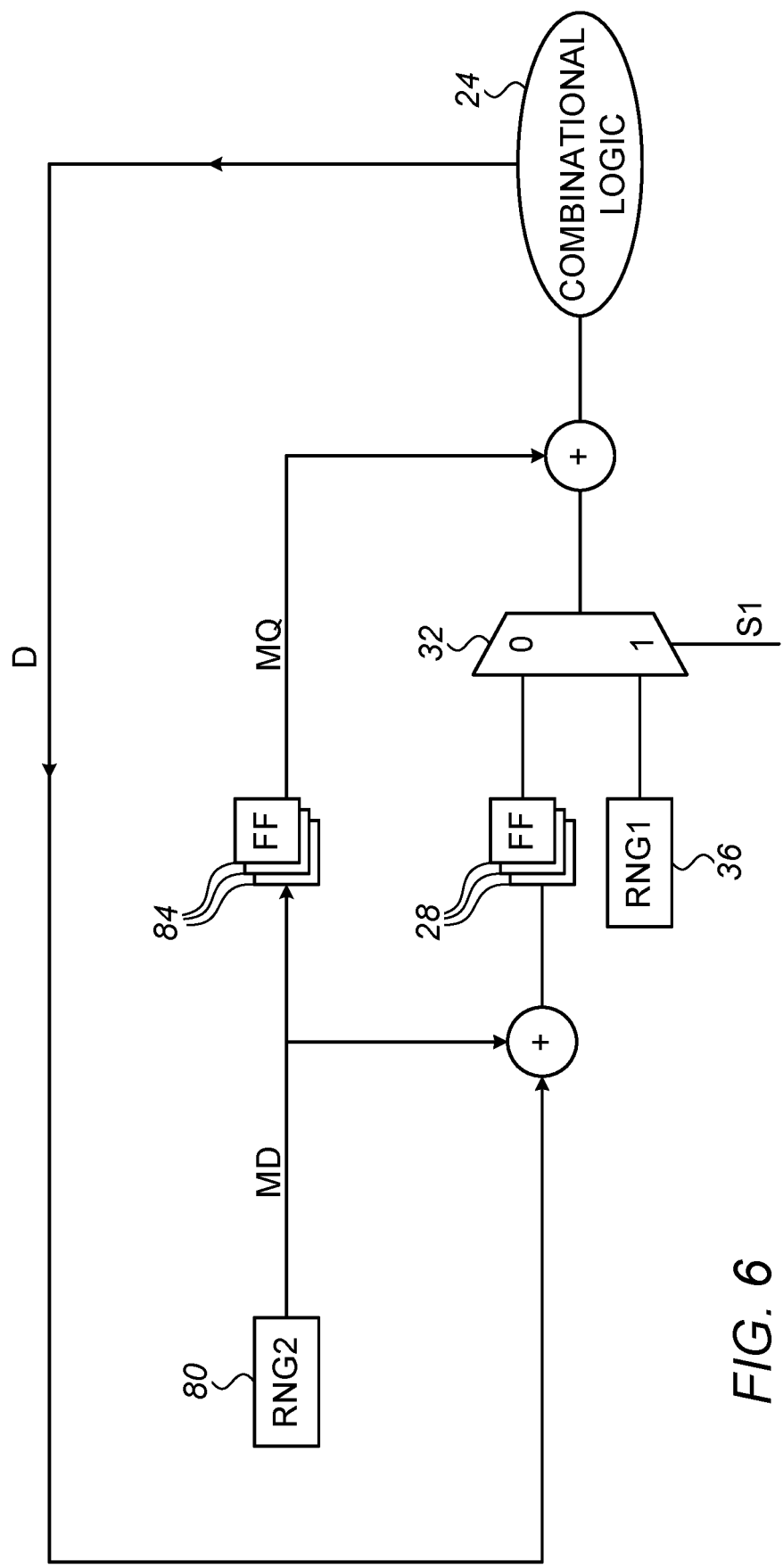
FIG. 6 is a block diagram that schematically illustrates a secure electronic device protected against side-channel attacks, in accordance with an alternative embodiment of the present invention.

In some embodiments, the physical distance between FFs 28 and MUX 32 is kept to a minimum so as to minimize the FF output load and thus minimize leakage. Additionally or alternatively, leakage from FFs 28 may be protected using additional countermeasures, e.g., DRP or by masking (as depicted in FIG. 6 below).

Alternation Between Random Data and Functional Data, with Guaranteed Sampling of Functional Data, by Delay Balancing in Combinational Logic As noted above, in order to ensure that FFs 28 never sample the random data on outputs D1, the minimum propagation time via combinational logic 24 must be no less than the time duration by which the beginning of the random data (at inputs M1) precedes the sampling time of FFs 28. In the scheme of FIG. 2, for example, this time duration is the duration between time 44 (on signal S1) and the following time 40 (on signal C1). Any path through combinational logic 24 must have a propagation delay larger than this time duration.

In some embodiments, the above constraint (ensuring that the propagation delay of any path via combinational logic 24 is no less than a given time duration) is applied during the design of the IC implementing logic 24. For example, during the IC design, the hold-time margin of logic 24 may be set to a value that is at least the given time duration. This hold-time margin is typically larger than the margin necessary to ensure correct timing.

Generally, setting such a lower bound on the propagation delays can be performed at any stage of the IC design, e.g., during synthesis, Place & Route (P&R), or other stage.

Typically, setting a lower bound on the propagation delay is implemented by deliberately increasing the propagation delay of the (one or more) fastest signal paths in logic 24. Other paths, whose propagation delays are inherently higher than the given time duration, need not be changed. In some embodiments, certain signal paths for which security is not needed, e.g., paths that do not convey secret information, are also excluded from balancing regardless of their propagation delays.

The balancing operation reduces the variation in propagation delay between different paths. Therefore, in such cases "setting a lower bound on the propagation delay of the various paths via logic 24" is equivalent to "balancing the propagation delays of the various paths via logic 24." The more balanced logic 24 is, the more hold-time margin it has. This margin can be used, as explained above, for inserting random data that randomizes power consumption but is never sampled.

One possible way of ensuring that the propagation delays are sufficiently high is to insert explicit delay elements between some of the logic stages of combinational logic 24.

FIG. 4 is a block diagram that schematically illustrates combinational logic 24 with balanced delays, in accordance with an embodiment of the present invention. In this highly simplified example, the logic stages of combinational logic 24 comprise three logic gates denoted G1, G2 and G3. Each of these gates has a certain propagation delay. In order to balance the propagation delays across the various paths in logic 24, two delay elements 48 are inserted in the design. The delay element denoted DLY_G1 approximates the propagation delay of gate G1, and the delay element denoted DLY_G2 approximates the propagation delay of gate G2. As a result, all three signal paths via logic 24 have approximately the same delay.

Delay elements such as DLY_G1, DLY_G2 and DLY_G3 may be implemented in any suitable way, e.g., using dummy logic cells, using buffers, or using routing (e.g., longer traces), for example.

The scheme of FIG. 4 is depicted purely by way of example. In alternative embodiments, any other suitable technique can be used for balancing the propagation delays of the various signal paths in combinational logic 24.

In an example embodiment, the following pseudo-code can be used for delay balancing:

Load the IC design and its timing constraints into a static timing analysis tool (e.g. synopsys's PrimeTime or IC compiler)
    Set TBL according to design tradeoffs||TBL is the timing balancing limit
    For each output pin of logic 24 cells:
        Get the timing path having the minimum slack that passes through this pin
        If needed, add delay cells to increase the delay until the minimal path timing slack is smaller than TBL This process may run, for example, at the post-routing stage of the design with slow simulation conditions (e.g., a combination of: high temperature, low voltage, slow cell process corner model and high capacitance routing).

Additionally or alternatively, delay balancing can be improved by setting a suitable lower bound on the setup-time margin in the design timing optimization tool (beyond the setup-time margin needed for meeting the design timing requirements). Constraining the setup-time is advantageous, for example, because (i) the delay, which may later be needed for balancing, is reduced, and (ii) process variations between the longest and shortest path will shrink.

Example RNG Configurations

In various embodiments, RNG 36 may be implemented using any suitable analog and/or digital circuitry. RNG 36 is not necessarily clocked, and may therefore be implemented using an analog source of noise. In other embodiments, RNG 36 may be implemented using all-digital hardware, e.g., using clocked logic that generates a pseudorandom data sequence. In some embodiments, RNG 36 reuses existing security-related circuitry of secure device 20, e.g., a Secure Hash Algorithm (SHA) or Advanced Encryption Standard (AES) cryptographic engine. In such a case, it is recommended to run the SHA or AES each time with random seed.

Figure 5A:
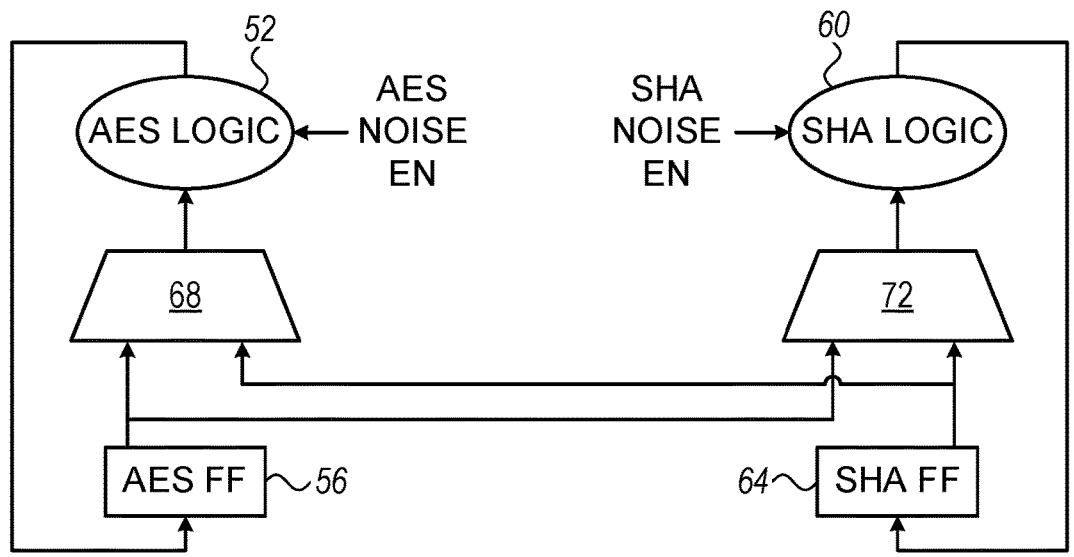
FIG. 5A is a block diagram that schematically illustrates a random number generator comprising two interconnected cryptographic engines, in accordance with an embodiment of the present invention.

FIG. 5A is a block diagram that schematically illustrates a random number generator, which can be used for implementing RNG 36, in accordance with an embodiment of the present invention. This implementation is useful, for example, when device 20 already employs SHA and AES for performing secure operations other than the disclosed side-channel attack countermeasures.

In the example of FIG. 5A, the RNG comprises two interconnected RNGs (also referred to as cryptographic engines): An AES RNG, comprising AES logic 52 and a FF 56, is shown of the left-hand side of the figure, and a SHA RNG, comprising SHA logic 60 and a FF 64, is shown of the right-hand side. A MUX 68 receives the outputs of FFs 56 and 64 and multiplexes them to the input of AES logic 52. A MUX 72 receives the outputs of FFs 56 and 64 and multiplexes them to the input of SHA logic 60.

In some embodiments, during some of the time device 20 uses the AES engine, and the SHA engine is not used. During other times, device 20 uses the SHA engine, and the AES engine is not used. In these embodiments, the unused RNG can be reused and serve as RNG 36 for generating the random data (RPD). In other words, when device 20 uses the AES engine and the SHA engine is unused, the SHA engine is used for generating RPD. When device 20 uses the SHA engine and the AES engine is unused, the AES engine is used for generating RPD.

FFs 56 and 64 may represent internal registers of the AES and SHA engines, and are not necessarily coupled to the main module outputs (e.g., the AES cipher or the SHA digest). Thus, while the corresponding cryptographic engine is running, these values may change every clock cycle.

The AES_NOISE_EN and SHA_NOISE_EN signals can be used to enter the corresponding cryptographic engine into a 'noise' state in which the engine continuously digests more and more data so as to keep generating random numbers until it is stopped (e.g. until the corresponding NOISE_EN signal is de-asserted). MUXs 68 and 72 are analogous to MUX 32 of FIG. 1.

Figure 5B:
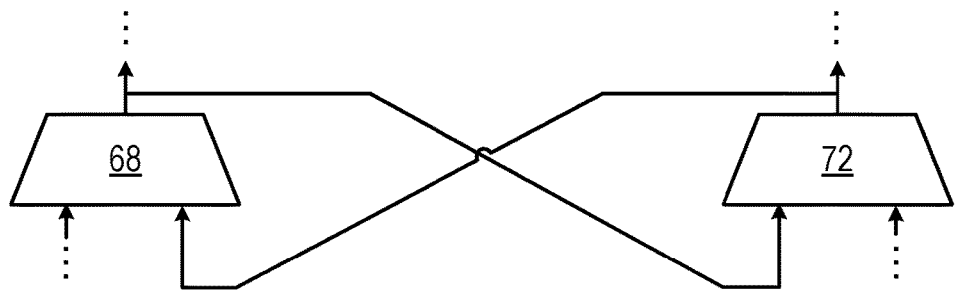
FIG. 5B is a block diagram that schematically illustrates an alternative multiplexer configuration for the random number generator of FIG. 5A, in accordance with an embodiment of the present invention.

FIG. 5B is a block diagram that schematically illustrates an alternative configuration of MUXs 68 and 72 for the random number generator of FIG. 5A, in accordance with an embodiment of the present invention. The other parts of the RNG remain unchanged.

The RNG configurations of FIGS. 5A and 5B are depicted purely by way of example. In alternative embodiments, any other suitable implementation can be used. For example, the RNG may be implemented using any other suitable combination of two or more cryptographic engines of any kind, e.g., Rivest-Shamir-Adleman (RSA), Elliptic-Curve Cryptography (ECC) or Cyclic Redundancy Check (CRC), for example.

Integration With Additional Countermeasures

FIG. 6 is a block diagram that schematically illustrates a secure electronic device protected against side-channel attacks, in accordance with an alternative embodiment of the present invention. FIG. 6 demonstrates that the protection scheme of FIG. 1-3 can be combined with additional security countermeasures. FIG. 6 shows one possible countermeasure, by way of example.

In the present example, the data read from and written to FFs 28 is further masked using an additional RNG 80. The random data generated by RNG 80 (denoted MD) is combined (e.g., using bitwise XOR) with the outputs of combinational logic 24 (denoted D) before sampling by FFs 28. In addition, additional FFs 84 sample the random data MD. The sampled outputs of FFs 84 (denoted MQ) are combined (e.g., using bitwise XOR) with the sampled output of MUX 32, before driving the inputs of combinational logic 24.

Additional Embodiments and Variations

In some embodiments, RNG 36 modifies the random data multiple times per clock cycle. For example, referring to signal M1 in FIG. 2, the value of the random data changes at least once during each interval marked RPD.

In some embodiments, the timing of applying the random data and the functional data is not fixed. By modifying the timing, it is possible to control the percentage of the clock cycle during which random data is applied, and the remaining percentage of the clock cycle during which functional data is applied. It is also possible to control the time duration by which the beginning of the random data (times 44 in FIGS. 2 and 3) precedes the FF sampling time (times 40 in FIGS. 2 and 3). In the configuration of FIG. 1, for example, the timing may be modified by modifying the delay DLY3.

In the present context, the term "timing of applying the random data and the functional data" means the size, and/or the location in the clock cycle, of the time interval between the beginning of the random data (e.g., times 44) and the FF sampling time (e.g., times 40).

In some embodiments, the timing of applying the random data and the functional data is set individually per secure device 20, based on the individual performance of the combinational logic in that device. This setting can exploit, for example, statistical variations in hold-time margin between individual secure devices, e.g., due to process variations.

Consider, for example, a certain device 20 in which combinational logic 24 happens to have a high setup-time margin and a low hold-time margin. In this individual device 20, the timing can be set to start applying the random data later relative to the FF sampling time (time 40) and stop applying the random data only after the FF sampling time (time 40). Setting of this sort may be performed at any suitable time, e.g., during production or final testing of device 20, or during operation. Such setting is sometimes referred as circuit calibration or training sequence.

Additionally or alternatively, in a particular secure device 20, the protection circuitry may adapt the timing of applying the random data and the functional data over time, depending on the present actual performance of the combinational logic. This adaptation can exploit, for example, variations in propagation delay that occur over time, e.g., depending on temperature, voltage or other operating conditions. (The adaptation may also exploit the device-to-device variations addressed above).

In an example embodiment, the protection circuitry may apply a predefined training sequence to the inputs (M1) of combinational logic 24, and estimate the hold-time margin (or, equivalently, the extent of balance between the propagation delays of the signal paths) of combinatorial logic 24, by monitoring the outputs (D1) of the combinatorial logic, and set the timing (e.g., DLY2 and DLY3) accordingly. Adaptation of this sort may be performed, for example, on power-up or reset, periodically, and/or before every cryptographic operation that uses combinational logic 24.

In such an embodiment, at times when the hold-time margin is high, security can be enhanced by applying random data earlier in the clock cycle (longer before FF sampling time). At other times, when the hold-time margin is lower, random data may have to be applied later in the clock cycle (shorter before FF sampling time), but in such cases, typically, the setup margin is higher so the random data may also be applied some time after the data sampling time.

In a typical embodiment, the hold-time margin is high at the slow Process-Voltage-Temperature (PVT) corner, i.e., when the combination of process variations, voltage and temperature causes slowest propagation time in combinational logic 24. Under these conditions, security can be enhanced by applying random data earlier in the clock cycle (longer before FF sampling time). By the same token, the hold-time margin tends to be small at the fast Process-Voltage-Temperature (PVT) corner, in which case random data may have to be applied later in the clock cycle (shorter before FF sampling time).

To demonstrate the benefit of adapting the timing of applying random and functional data, consider the following numerical example. Assume that (i) the minimum propagation time of logic 24 is 10 nS at the slow PVT corner, and 6 ns at the fast PVT corner, and (ii) the maximum propagation time of logic 24 is 20 nS at the slow PVT corner, and 12 ns at the fast PVT corner.

In such a case, the protection circuitry may perform adaptive calibration of DLY2 and DLY3, so that, for example, at the slow PVT corner, RPD can be applied (i.e., time 44 can be set to) 10 ns before FF sampling time (i.e., before time 40) until FF sampling time (i.e., until time 40). At the fast PVT corner, RPD can be applied (i.e., time 44 can be set to) 6 ns before FF sampling time (i.e., before time 40) until 8 nS after FF sampling time (i.e., after time 40).

In the above examples, setting of the timing of applying the random data and the functional data aims to maximize the duty-cycle (percentage of the clock cycle) in which random data is applied, while ensuring that random data will not be sampled. This criterion also minimizes the duty-cycle (percentage of the clock cycle) in which functional data is applied. As a result, static leakage from secure device 20 is also reduced.

The configurations of the secure devices, combinational logic circuits and random number generators shown in FIGS. 1, 4, 5A, 5B and 6, are example configurations that are depicted purely for the sake of conceptual clarity. In alternative embodiments, any other suitable configurations can be used. In various embodiments, any of the disclosed the secure devices, combinational logic circuits and/or random number generators may be implemented using any suitable hardware, such as using one or more discrete components, one or more Application-Specific Integrated Circuits (ASICs) and/or one or more Field-Programmable Gate Arrays (FPGAs).

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. An electronic device, comprising:
   a combinational logic circuit, having one or more inputs and one or more outputs;
   one or more state-sampling components, configured to sample the outputs of the combinational logic circuit at successive clock cycles; and
   protection circuitry, configured to protect the combinational logic circuit by performing, per clock cycle:
   starting to apply random data to the inputs of the combinational logic circuit a given time duration before a sampling time of the state-sampling components for that clock cycle; and
   after applying the random data, switching to apply functional data to the inputs of the combinational logic circuit, to be sampled by the state-sampling components,
   wherein a propagation delay, over any signal path via the combinational logic circuit between the inputs and the outputs, is no less than the given time duration by which a beginning of the random data precedes the sampling time of the state-sampling components.

2. The electronic device according to claim 1, wherein both the random data and the functional data are provided as input to the state-sampling components, but, due to the propagation delay being no less than the given time duration, the state-sampling components sample only the functional data and not the random data.

3. The electronic device according to claim 1, wherein the combinational logic has a hold-time margin that is set to be at least the given time duration.

4. The electronic device according to claim 3, wherein the combinational logic comprises one or more delay elements inserted in one or more signal paths, for setting the hold-time margin to be at least the given time duration.

5. The electronic device according to claim 1, wherein the electronic device comprises at least first and second cryptographic engines for performing cryptographic operations, and wherein the protection circuitry is configured to generate the random data using the first cryptographic engine while the first cryptographic engine is not used for performing the cryptographic operations, and to generate the random data using the second cryptographic engine while the second cryptographic engine is not used for performing the cryptographic operations.

6. The electronic device according to claim 1, wherein the protection circuitry is configured to modify the random data multiple times per clock cycle.

7. The electronic device according to claim 1, wherein a timing of applying the random data and the functional data is preconfigured in the electronic device based on an individual performance of the combinational logic.

8. The electronic device according to claim 1, wherein the protection circuitry is configured to adaptively modify a timing of applying the random data and the functional data over time, based on actual performance of the combinational logic.

9. The electronic device according to claim 8, wherein the protection circuitry is configured to adaptively modify the timing so as to maximize a duty-cycle of applying the random data.

10. The electronic device according to claim 1, wherein the random data has completed propagation through all signal paths via the combinational logic circuit before subsequent functional data is applied to the inputs of the combinational logic circuit.

11. A method for protecting a combinational logic circuit having one or more inputs and one or more outputs, the method comprising:
sampling the outputs of the combinational logic circuit at successive clock cycles using one or more state-sampling components; and
protecting the combinational logic circuit by performing, per clock cycle:
starting to apply random data to the inputs of the combinational logic circuit a given time duration before a sampling time of the state-sampling components for that clock cycle; and
after applying the random data, switching to apply functional data to the inputs of the combinational logic circuit, to be sampled by the state-sampling components,
wherein a propagation delay, over any signal path via the combinational logic circuit between the inputs and the outputs, is no less than the given time duration by which a beginning of the random data precedes the sampling time of the state-sampling components.

12. The method according to claim 11, wherein both the random data and the functional data are provided as input to the state-sampling components, but, due to the propagation delay being no less than the given time duration, the state-sampling components sample only the functional data and not the random data.

13. The method according to claim 11, wherein the combinational logic has a hold-time margin that is set to be at least the given time duration.

14. The method according to claim 13, wherein the combinational logic comprises one or more delay elements inserted in one or more signal paths, for setting the hold-time margin to be at least the given time duration.

15. The method according to claim 11, wherein the electronic device comprises at least first and second cryptographic engines for performing cryptographic operations, and wherein generating the random data comprises generating the random data using the first cryptographic engine while the first cryptographic engine is not used for performing the cryptographic operations, and generating the random data using the second cryptographic engine while the second cryptographic engine is not used for performing the cryptographic operations.

16. The method according to claim 11, and comprising modifying the random data multiple times per clock cycle.

17. The method according to claim 11, and comprising preconfiguring, in the electronic device, a timing of applying the random data and the functional data based on an individual performance of the combinational logic.

18. The method according to claim 11, and comprising adaptively modifying a timing of applying the random data and the functional data over time, based on actual performance of the combinational logic.

19. The method according to claim 18, wherein adaptively modifying the timing comprises maximizing a duty-cycle of applying the random data.

20. The method according to claim 11, wherein the random data has completed propagation through all signal paths via the combinational logic circuit before subsequent functional data is applied to the inputs of the combinational logic circuit.

* * * * *